United States Patent
Fischer et al.

(10) Patent No.: US 6,904,187 B2
(45) Date of Patent: Jun. 7, 2005

(54) METHOD OF EFFICIENT CARRIER GENERATION IN SILICON WAVEGUIDE SYSTEMS FOR SWITCHING/MODULATING PURPOSES USING PARALLEL PUMP AND SIGNAL WAVEGUIDES

(75) Inventors: Jan-Malte Fischer, Essen (DE); Franz X. Kaertner, Newton, MA (US); Kazumi Wada, Lexington, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 52 days.

(21) Appl. No.: 10/643,414

(22) Filed: Aug. 19, 2003

(65) Prior Publication Data

US 2004/0114847 A1 Jun. 17, 2004

Related U.S. Application Data

(60) Provisional application No. 60/411,442, filed on Sep. 17, 2002, and provisional application No. 60/404,494, filed on Aug. 19, 2002.

(51) Int. Cl.[7] .............................................. G02F 1/295
(52) U.S. Cl. ............................... 385/5; 385/14; 385/49; 385/50
(58) Field of Search ................................. 385/5, 14–24, 385/49, 50, 131, 132

(56) References Cited

U.S. PATENT DOCUMENTS

| | | | |
|---|---|---|---|
| 4,693,547 A | 9/1987 | Soref et al. ..................... | 385/16 |
| 5,694,498 A | 12/1997 | Manasson et al. ............ | 385/15 |
| 6,222,951 B1 * | 4/2001 | Huang .......................... | 385/14 |
| 2004/0252957 A1 * | 12/2004 | Schmidt et al. ............. | 385/131 |

OTHER PUBLICATIONS

"Single–Mode Silicon Optical Switch with T–Shape $SiO_2$ Waveguide as a Control Gate," Iida et al. *IEEE International SOI Conference*. Oct. 2001.
"Silicon–Based Optoelectronics," Soref. *Proceedings of the IEEE*. Dec. 1993. vol. 81, No. 12.
"Integrated Optics in Silicon and SiGe–Heterostructures," Schuppert et al., *Journal of Lightwave Technology*. Oct. 1996. vol. 14, No. 10.
"Improving the Reponse of Optical Phase Modulators in SOI by Computer Simulation," Hewitt et al. *Journal of Lightwave Technology*. Mar. 2000. vol. 18, No. 3.
"Infrared Optical Switch by the Use of Optically Excited Free Carriers in Semiconductors," Saito et al. *Review of Scientific Instruments*. May 2000. vol. 71, No. 5.
"SiGe/Si Mach–Zehnder Interferometer Modulator based on the Plasma Dispersion Effect," Li et al. *Applied Physics Letters*. Apr. 1999. vol. 74, No. 15.
"Single–Mode Silicon Optical Switch with T–Shape $SiO_2$ Waveguide as a Control Gate," Kobayashi et al. Japanese Journal of Applied Physics, vol. 41, pp.: 2563–2565, Part 1, No. 4B, Apr. 2002.
"Photoconductivity effects in polycrystalline silicon and optically controlled coplanar waveguide switch", Twarowski et al., Ann. Telecommunications, 56 n° 3–4, 2001, pp.: 208–214.

* cited by examiner

*Primary Examiner*—Phan T. Palmer
(74) *Attorney, Agent, or Firm*—Gauthier & Connors LLP

(57) ABSTRACT

An optical switch/modulating device includes a pump waveguide that provides a pump light to the switch/modulating device. A waveguide element is positioned parallel to the pump waveguide and receives the pump light that causes the waveguide element to switch or modulate a signal light running through the pumped waveguide.

24 Claims, 10 Drawing Sheets

METHOD OF EFFICIENT CARRIER GENERATION IN SILICON WAVEGUIDE SYSTEMS FOR SWITCHING/MODULATING PURPOSES USING PARALLEL PUMP AND SIGNAL WAVEGUIDES

PRIORITY INFORMATION

This application claims priority from provisional application Ser. No. 60/404,494 filed Aug. 19, 2002 and provisional application Ser. No. 60/411,442 filed on Sep. 17, 2002, both of which are incorporated herein by reference in their entireties.

BACKGROUND OF THE INVENTION

In the last decade, a rapid increase in network traffic has been observed. The main driving force behind this is the explosive growth of the Internet. Thus, there was and still is a tremendous demand for faster network solutions. Optical networks are preferred because optical fibers offer a huge bandwidth accompanied with outstanding low loss. However, along with the increase in traffic, there has been the continuous demand for more processing power and the necessity of linking both together.

The most commonly used semiconductor material for microelectronics is silicon. The whole chip industry is based on this. Silicon is relatively easy and cheap to process and the fabrication methods are very well established.

Therefore, silicon optoelectronics is a very promising link between optics and electronics. Recent work has shown that infrared light ($\lambda > 1.2$ $\mu$m) can be waveguided, detected, modulated and switched in silicon, and thus at the fiber-optic communications wavelengths 1.3 $\mu$m and 1.55 $\mu$m. Silicon optoelectronics has the major advantage of performing on well-explored technological platforms. It can also be used in helping to solve interconnection problems, and has the ability to improve current microelectronics. The advantages of silicon optoelectronics will allow for the integration of electronics and optics.

SUMMARY OF THE INVENTION

According to one aspect of the invention, there is provided an optical switch/modulating device. The optical switch/modulating device includes a pump waveguide that provides the pump light to the switch. A waveguide element is positioned parallel to the pump waveguide, and receives the pump light that causes the waveguide element to switch or modulate a signal light running through the pump waveguide.

According to another aspect of the invention, there is provided a method of forming an optical switch/modulating device. The method includes providing a pump waveguide that provides a pump light to the switch/modulating device. The method also includes positioning a waveguide element parallel to the pump waveguide that receives the pump light that causes the waveguide element to switch or modulate a signal light running through the pumped waveguide.

DETAILED DESCRIPTION OF THE INVENTION

A new structure for all-optical switches/modulators in silicon waveguide technology using the plasma dispersion effect is disclosed. An important aspect of the invention is the parallelism of a pump waveguide system and the silicon waveguide system in the active area of a switch/modulator for efficient carrier generation in the silicon waveguide. The general purpose is the improvement of silicon waveguide switches/modulators based on the plasma dispersion effect. Optical switches/modulators are needed in integrated circuits and silicon based optics.

The plasma effect is based on the change of the optical properties of silicon induced by free carriers. Considering the classic dispersion theory, those carriers will alter the real and imaginary part of the dielectric constant of silicon. For wave propagation in these media, this means that the refraction and absorption indices are changed by the amounts $\Delta n$ and $\Delta \alpha$, respectively. Based on the classical first order model, the analysis generalized for two carriers (electrons and holes) shows that:

$$\Delta n = \frac{e^2 \lambda^2}{8\pi^2 c^2 \varepsilon_0 n}\left(\frac{\Delta N_e}{m_e} + \frac{\Delta N_h}{m_h}\right) \qquad \text{Eq. 1}$$

$$\Delta \alpha = \frac{e^2 \lambda^2}{4\pi^2 c^2 \varepsilon_0 n}\left(\frac{\Delta N_e}{m_e^2 \mu_e} + \frac{\Delta N_h}{m_h^2 \mu_h}\right) \qquad \text{Eq. 2}$$

where e is elementary charge, $\lambda$ is wavelength of light in vacuum, c is speed of light in vacuum, $\epsilon_0$ is permittivity of free space, n is refractive index, $\Delta N_e$ is free carrier concentration of electrons, $\Delta N_h$ is free carrier concentration of holes, $m_e$ is effective mass of electrons, $m_h$ is effective mass of holes, $\mu_e$ is free carrier mobility of electrons, and $\mu_h$ is free carrier mobility of holes. There are also empirical laws, which are slightly different, but the basic predictions are the same.

Pump light of energy greater than the band gap of silicon, which is injected into the silicon waveguides, generates free carriers. The light guided in the silicon waveguides has energy lower than the silicon band gap (e.g. 1.3 $\mu$m or 1.55 $\mu$m (communication wavelengths). The change induced in the silicon properties by the pump light is used to switch/modulate the light (lower energy than the silicon band gap) guided in the silicon waveguide system.

Figure 1A:
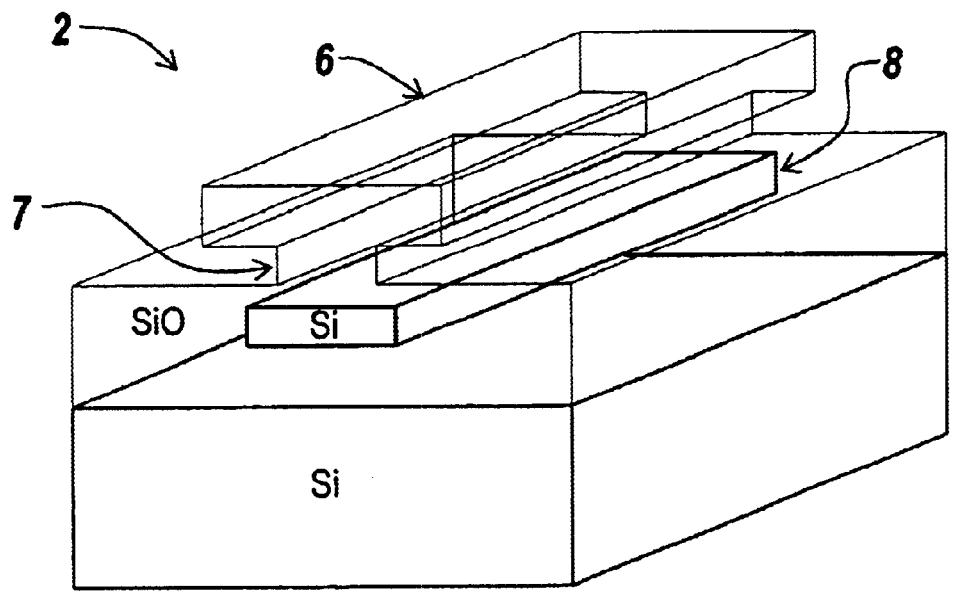
FIGS. 1A and 1B are schematic block diagrams demonstrating parallel guiding of pump light and signal light.
Figure 1B:
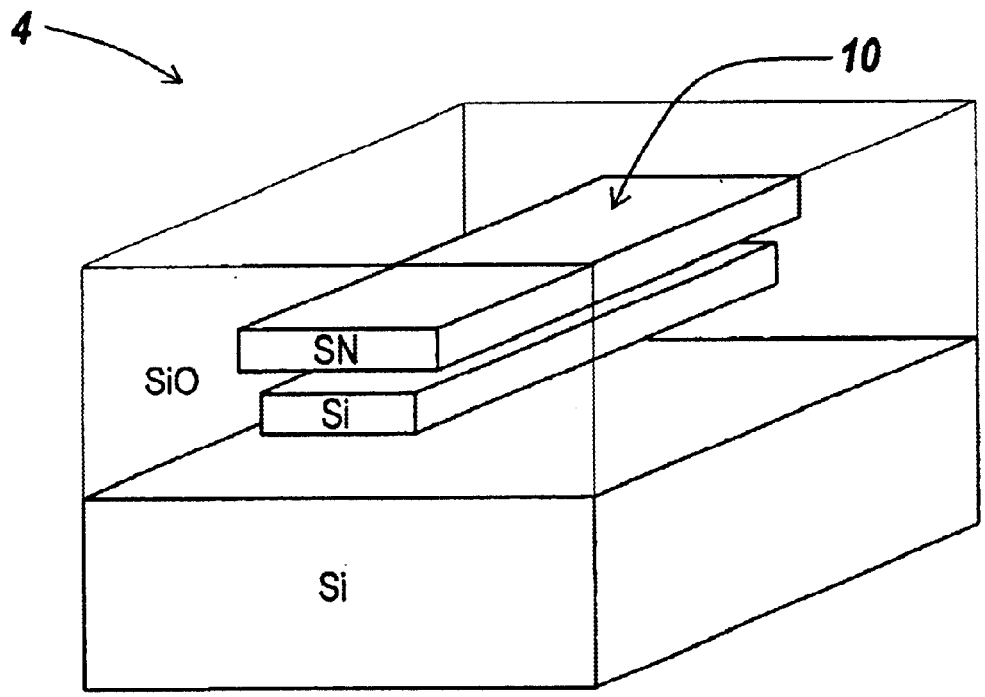

Another important aspect of the invention is to run a pump waveguide parallel with a silicon waveguide at the active region of a switch/modulator. The waveguide transporting the pump light usually has a lower refractive index than silicon has, because it is meant to guide light, which is absorbed by silicon. There are more possibilities for waveguiding the pump light, however, two exemplary embodiments of devices 2, 4 in accordance with the invention are shown in FIGS. 1A and 1B. If this state of parallel running waveguides is reached and those two are close enough to each other, the pump mode sees the higher refractive index of the silicon and becomes a leaky waveguide, which loses its power into the Si-waveguide. There, it will be absorbed and will alter the silicon properties, which is the switching/modulating mechanism.

In FIG. 1A, a waveguide 6 for the pump light is formed by a 'T'-shape silicon oxide. Due to this geometry, the effective refractive index is higher at the top of the 'T' than it is at its rack 7, therefore this works as a waveguide 2. This example shows that the pump light waveguide system can be fabricated of the same material, which is needed anyway to clad the signal silicon waveguide 8, for passivation purposes.

FIG. 1B presents another possibility. In this case, a third material is used to form the pump waveguide 10. Its refractive index has to be higher than the one of its surrounding and it has to be lower than that of silicon. In this embodiment, it is silicon nitride. This is obviously a reasonable choice but not the only possible one. The refractive index of silicon nitride is somewhere around 2.0, but it depends on its composition. Silicon nitride has the advantage that it can be fabricated on the same technological platform as the silicon on silicon oxide waveguides.

Figure 2A:
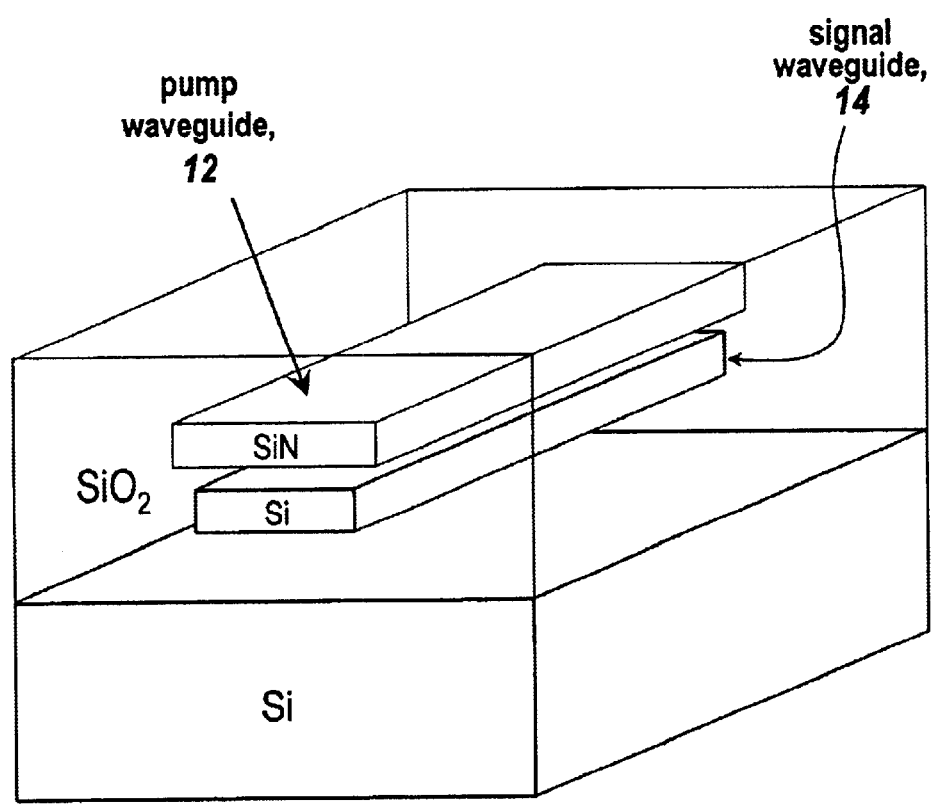
FIG. 2A is a detailed schematic block diagram of the structure shown in FIG. 1B.

In order to confirm the new geometry of a pump waveguide 12 running parallel with a signal silicon waveguide 14, as shown in FIG. 2A, a couple of simulations have been executed. The simulations, described herein, are used to show the efficient carrier generation by the parallel pump and signal waveguides. Silicon nitride with a refractive index of 2.2 has been chosen to be the material used to form the pump-waveguide. The silicon waveguide 14 is simulated with a refractive index of 3.5. This is all embedded in silicon oxide, which has an assumed refractive index of 1.44. The silicon waveguide 14 is designed to be a single-mode at the signal wavelength of $\lambda$=1.55 $\mu$m, the height is 200 nm and the width is 500 nm. A wavelength of 800 nm is used for the pump light. The absorption coefficient of silicon for this wavelength is a $\alpha \approx 820$ cm$^{-1}$, which corresponds to an absorption length of roughly 12 $\mu$m.

Simulations have shown that it is advantageous to take a small pump waveguide 12, which is single-mode. The first reason for this is that the light in a small waveguide is guided more weakly so that a bigger amount of the power travels outside the core.

Figure 2B:
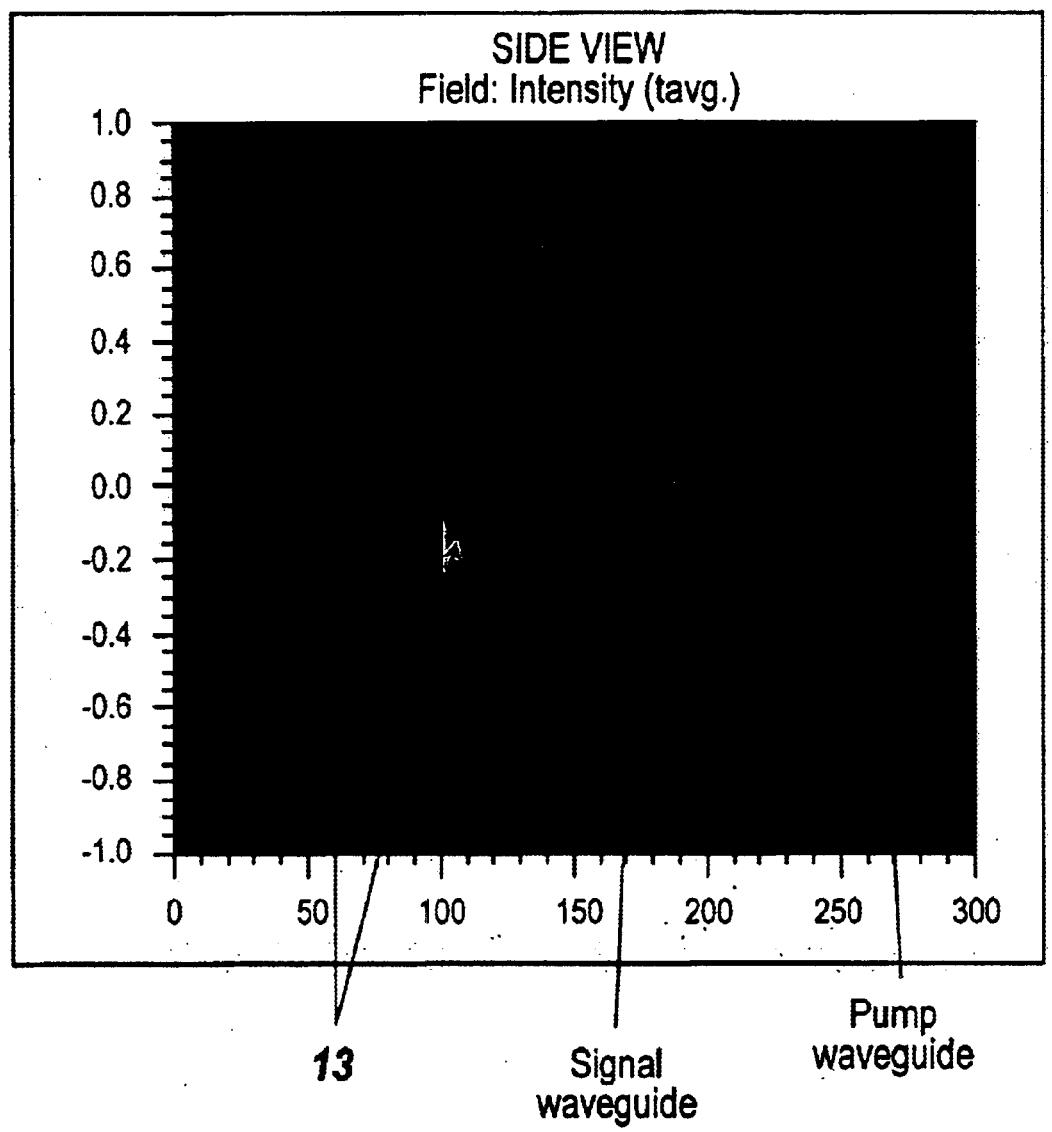
FIG. 2B is a graph showing the propagation of the pump light through the coupled waveguide system.

FIG. 2B shows the propagation of the pump light through the coupled waveguide system. The short wavelength pump light (at 800 nm) is rapidly absorbed in the Si-signal waveguide 14.

In addition, the center of the mode can be placed nearer to the silicon waveguide. This results in a bigger overlap of the pump mode with the silicon and thus the energy transfer improves. The second reason is that the energy transfer of one mode is easier to optimize than that of a couple of modes. When using a multi-mode waveguide, the simulations show that there are some modes that transfer their energy quite well to the silicon, but that there are also others which hardly couple to the silicon at all. Because of these reasons a silicon nitride pump waveguide has been chosen that is a single-mode at 800 nm, the height is 200 nm, and the width is 400 nm.

The coupling to the multi-mode waveguide can be improved by putting a mirrored pump waveguide 12 on the other side of the silicon waveguide 14. The mirrored waveguide does not need to be pumped, but it improves the energy transfer to the silicon.

The whole structure is divided into three sections. The region 13 indicates the intensity distribution in the waveguides 12, 14. The first and last sections have only the silicon nitride pump waveguide 12. There the input/output modes are calculated. In the middle section, a silicon waveguide 14 runs parallel with the pump waveguide 12. Different lengths of 50 $\mu$m, 75 $\mu$m and 100 $\mu$m of this section are taken for the simulation. The second parameter, which is altered in the simulations, is the separation between the two waveguides 12, 11, separations of 10 nm, 20 nm, 30 nm, 40 nm and 50 nm are chosen.

Figure 2C:
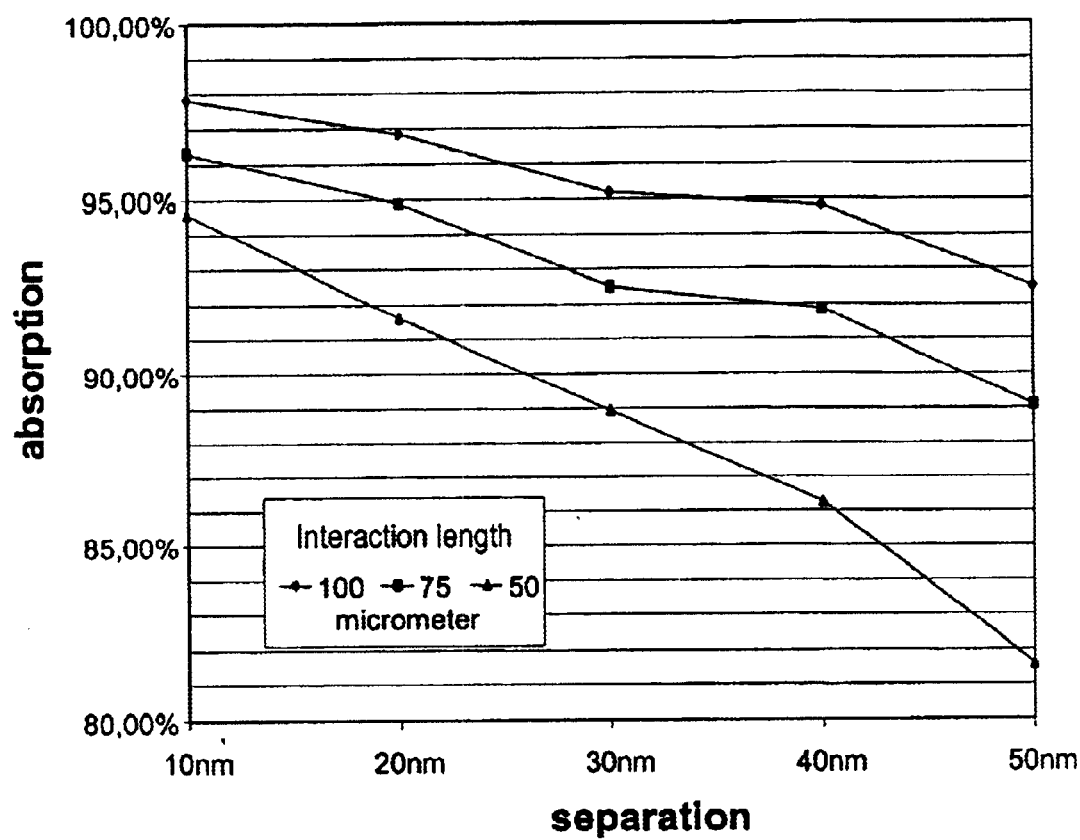
FIG. 2C is a graph showing the overall absorption of pump light in the signal waveguide for various length of the signal waveguide and as a function of waveguide separation.

The scattering matrices of the complete structure have been used for the calculations of the absorbed power. The amount of back-reflected power to the input is less than 0.3% for all cases. Thus, the major cause for not getting 100% absorption is the transmission through the structure. These results show that the pump light is transferred to the silicon waveguide 14 with a very high efficiency, as shown in FIG. 2C. It is evident that the power transfer increases with the interaction length and with smaller separations.

It is important that the pump light only couples to the silicon waveguide in the active area of the switch. Thus it is also important, how the state of parallelism is reached. It is obvious that this strongly depends on the geometry of the waveguide system of the infrared light at communication wavelength. Three possible geometries are shown in FIGS. 3A–3E.

Additionally, it is important to consider diffusion processes. In the case of the ring, shown in FIG. 3C, this is no problem because the carriers can only reach a surface of the waveguide, but they cannot diffuse into other parts of the silicon waveguide system. For FIGS. 3A and 3B, this is a problem. One solution is putting very thin groves at the beginning and the end of the active waveguide region (not displayed in these pictures), this would prevent the carriers from diffusing away.

Figure 3A:
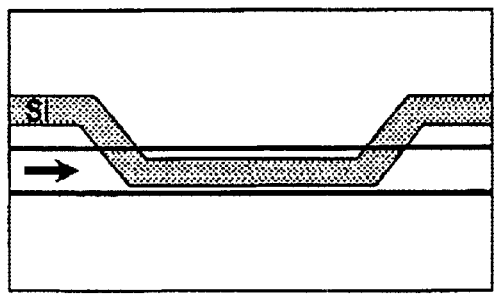
FIGS. 3A–3E are schematic diagrams of relative spatial waveguide arrangements.
Figure 3B:
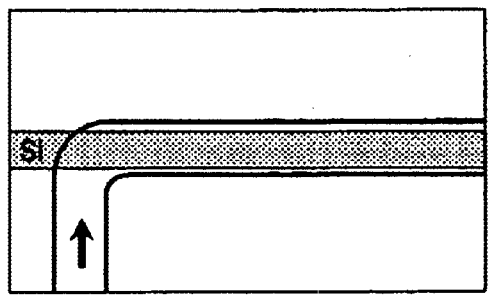
Figure 3C:
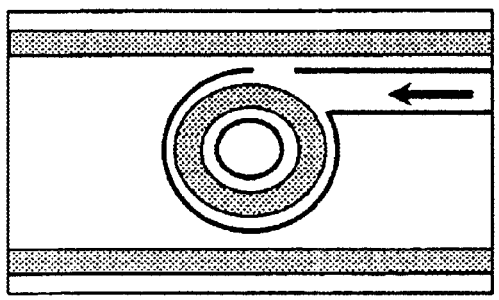
Figure 3D:
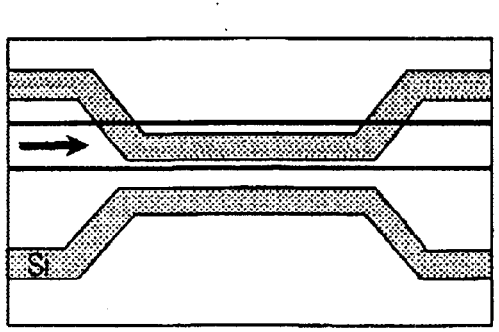
Figure 3E:
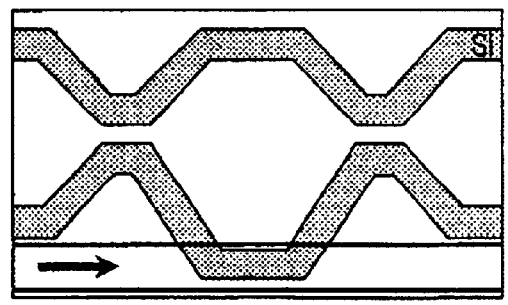

FIG. 3A shows an offset in the silicon waveguide and a straight pump waveguide that leads to a well-defined interaction region between the two. It is obvious that the offset could also be in the other waveguide. In FIG. 3B, a bend of the pump waveguide is displayed and FIG. 3C exhibits the pump ring on top (or below, both are possible) of the silicon ring. FIG. 3D shows a directional coupler geometry, and FIG. 3E shows an improved coupler.

Geometries like those in FIGS. 3A, 3B, 3D, and 3E have in common a carrier generation rate that is higher at one end of the active region than at the other end. Depending on the application, this need not be a problem, but it might be undesired.

Figure 4:
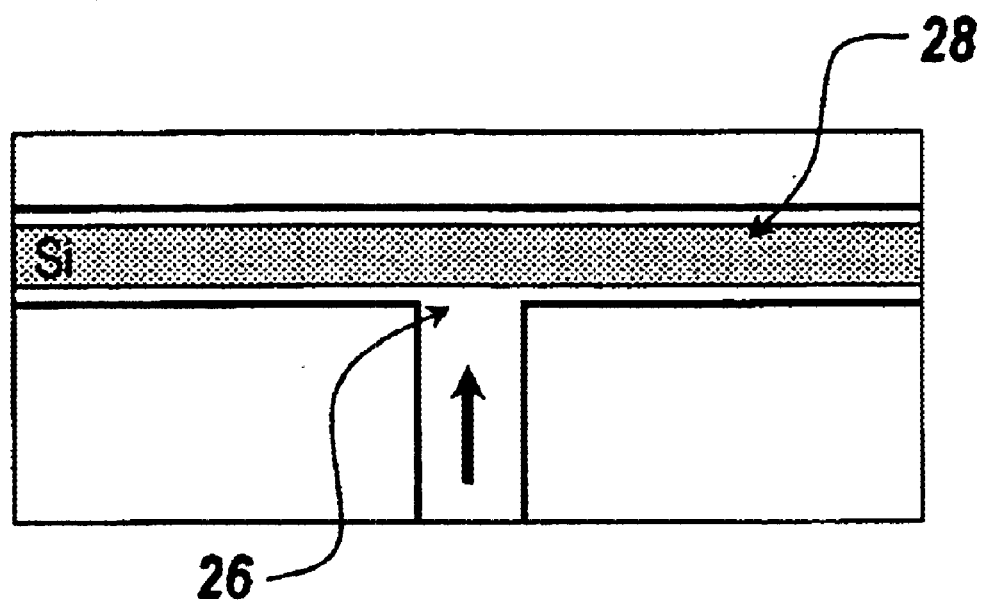
FIG. 4 is a schematic diagram showing how the pump light is guided parallel to the signal waveguide by using a T-splitter.

A more homogenous carrier-generation distribution can be achieved by a T-splitter structure, as shown in FIG. 4. The structure includes a pump light waveguide 26 (the arrow denotes the incoming direction of the pump light), and a silicon waveguide 28. These plain T-splitters have the disadvantage that there is a lot of back reflection. They have been significantly improved by using very small resonant structures.

There are two major advantages over existing methods: higher energy efficiency and possibility of integration. This is a very important point, because energy efficiency is desirable for different reasons. First, it is always a goal to get the same result with less power, which is for example very important when going to higher integration densities.

The second reason is very specific for applications using the plasma dispersion effect. Thermal heating also changes the refractive index and it counteracts the plasma dispersion effect. Thus, the thermal effect should be made as small as possible in order to see the strongest possible resulting effect dominated by the plasma dispersion effect. This higher energy efficiency is achieved in two ways: longer interaction length by using the parallelism between pump and signal waveguides and longer possible pump wavelength.

Traditionally, the pump light is applied perpendicular to the silicon. These silicon waveguides are typically very thin (~200 nm), which leads to a very short interaction length. That means that either the pump light wavelength has to be very short or only a small portion of the incoming energy will be absorbed in the waveguide. Thus, by using the disclosed parallel geometry, the interaction length can be made as long as needed. This provides the advantage that a much larger proportion of the incoming pump power is absorbed in the silicon waveguide, where it is needed.

Compared to conventional perpendicular illumination, the additional advantage is that the carriers are only generated where they contribute to an index change experienced by the signal light and no spot bigger than the active structure is illuminated. This, in addition, saves power and prevents undesired heating.

Figure 5:
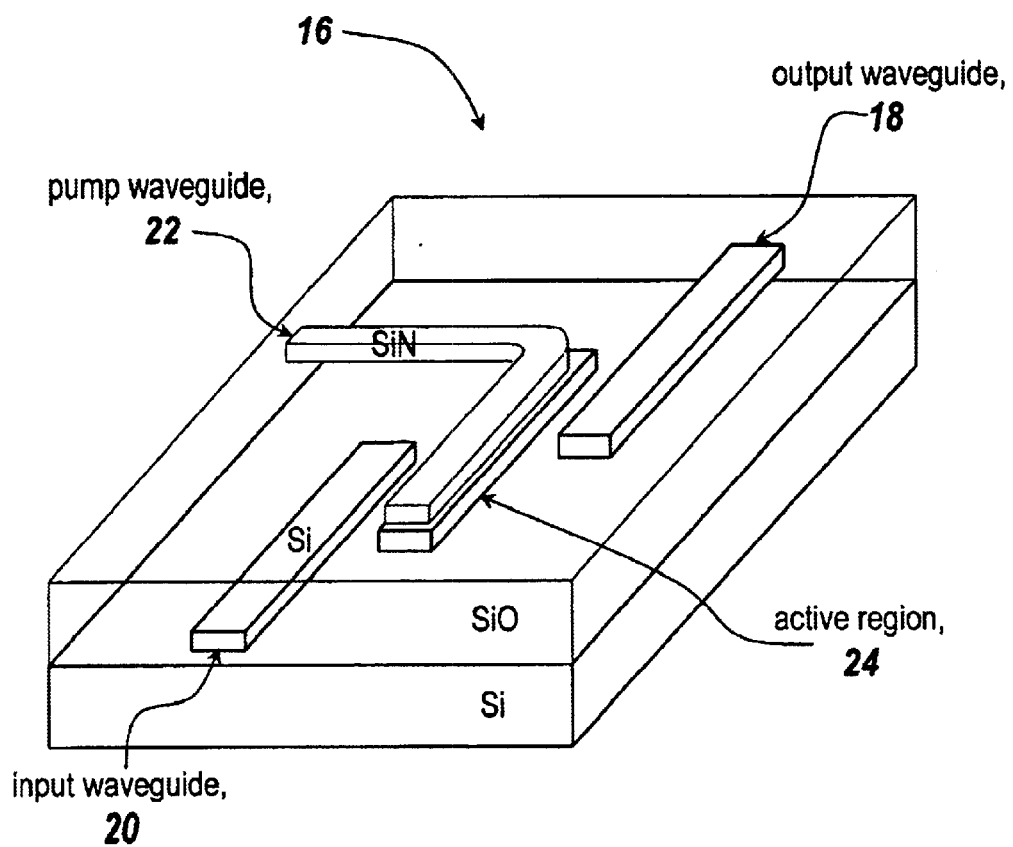
FIG. 5 is a schematic block diagram of a switching device formed using the invention.

A switching device 16 can be formed using the concepts of the invention, as shown in FIG. 5. The goal of the device 16 is to demonstrate that the plasma effect can be used for all-optical switching. A switching device as simple as possible is chosen in order to get the most relaxed restrictions on the fabrication. The device 16 is designed for a center wavelength of 1.55 $\mu$m and a bandwidth of 30 nm, which is suitable for applications in the communications sector. Note that the switching device 16 can also be used as a modulator device in other embodiments.

Silicon waveguides 18, 20, which transport the signal light at $\lambda$=1.55 $\mu$m are embedded in silicon oxide. A pump waveguide 22 is placed above a silicon active region 24 of the switch device 16. Both are running parallel for most of the distance. There is a thin layer of silicon oxide between the active region 24 and pump waveguide 22.

Figure 6A:
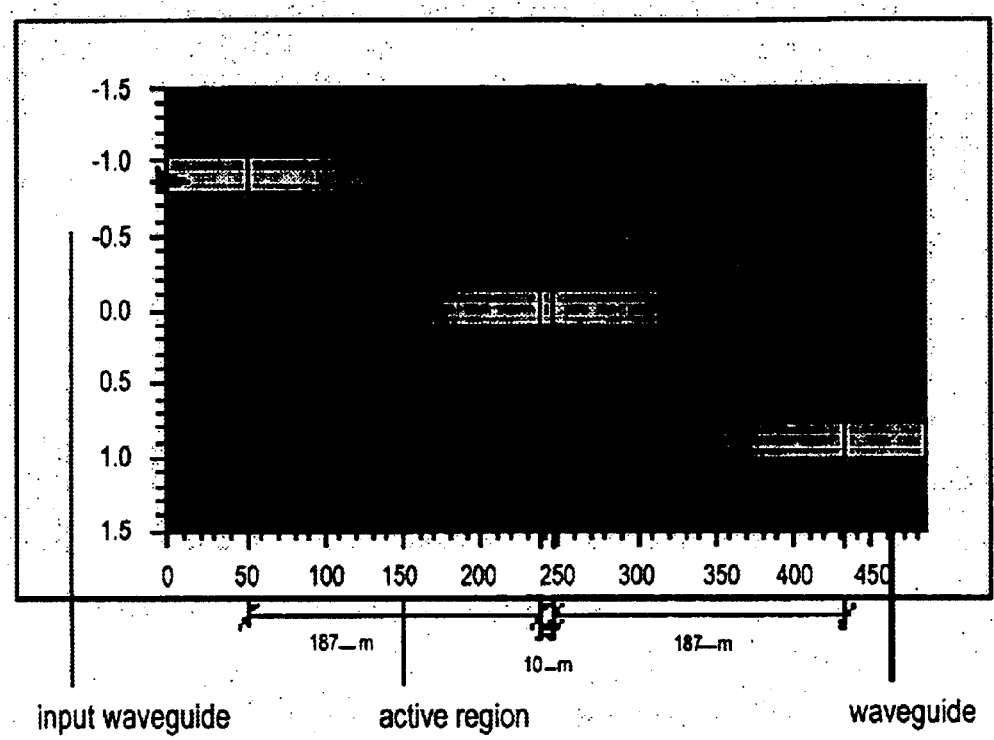
FIGS. 6A and 6B are simulation results showing the distribution of the signal light in the waveguide system in the ON and OFF state of the switch, respectively.

When the switch is in the ON-state, the power inserted at the input waveguide 20 is transmitted to the output waveguide 18, as shown in FIG. 6A. No pump light is applied to the active region 24. Due to the evanescent tail of the incoming mode, the light is coupled to the active region 24 and from there to the output waveguide 18. In the plane where the active region 24 ends, practically all the power is propagating in the output waveguide 18.

When the switch is in the OFF-state, for example, this means the pump light is ON, only very little power is transmitted from the input 20 to the output waveguide 18. The pump light is ON and it is transported by the pump waveguide 22 to the active region 24. There the pump light gets absorbed and creates free carriers. This alters the refractive index and inserts loss, accordingly, the coupling between the waveguides changes. The reductions of the refractive index as well as the inserted loss decrease the coupling length. In addition, the two waveguides 20, 24 become more and more decoupled, which means that after one coupling length not all the power is transferred to the other waveguide. The pump power is adjusted in a way that the power maximum at the end plane of the active region 24 is shifted into the pumped waveguide 24, thus almost no light is transmitted to the output waveguide 18.

In the simulations for the device 16, a refractive index for silicon dioxide of 1.44 and for silicon of 3.5 is assumed. Furthermore, due to the carrier injection, a change in refractive index of silicon of $-7.01 \times 10^{-3}$ and a change in the absorption coefficient of 38.57 cm$^{-1}$ are assumed. A silicon waveguide height of 200 nm, width of 500 nm, and a separation between the two silicon waveguides of 400 nm are chosen.

Figure 6B:
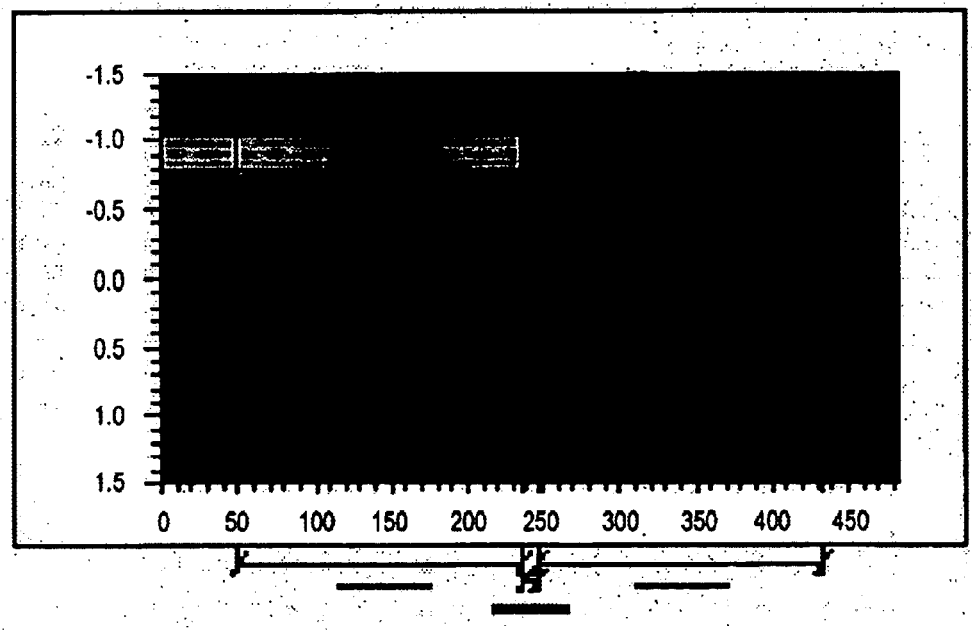

The length of the first coupling region, where the input waveguide 20 couples to the active area 24 is 187 $\mu$m long. The length between the two coupling areas has been arbitrarily chosen to be 10 $\mu$m. This length is not very important. The second coupling region, which is the part where the light couples to the output waveguide, has the same length as the first one, namely 187 $\mu$m. The field distribution in the waveguides for the case of the OFF-state are displayed in FIG. 6B.

Figure 7A:
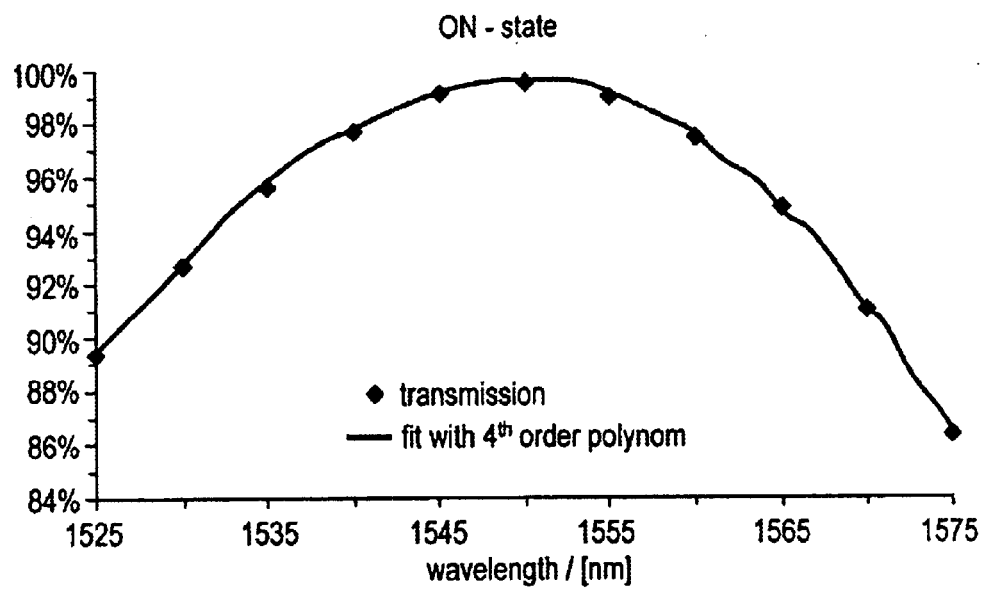
FIGS. 7A and 7B are graphs showing the transmission of signal light in the ON and OFF state of the switch.
Figure 7B:
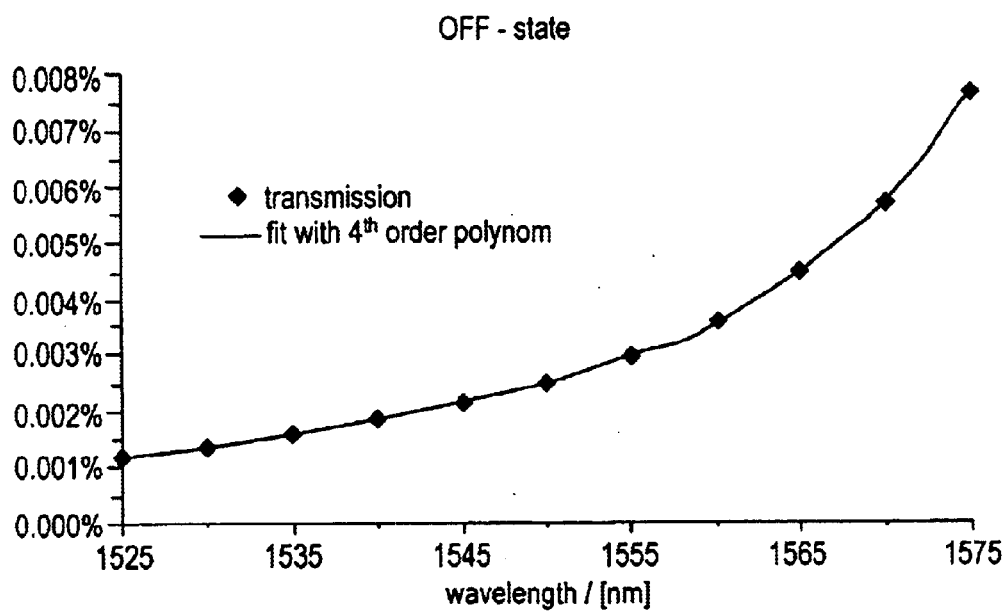

FIG. 7A shows the numerically calculated transmission performance of the device without any pump light, i.e., in the ON-state. The coupling coefficient is wavelength dependent, thus the transmission decreases when going away from the designed center wavelength. This is the effect, which limits the bandwidth of a coupler switch most. FIG. 7B shows that the transmission in the OFF-state, which is very low, not only, for the desired 30 nm from 1535 nm to 1565 nm, but even over a much wider range. Nevertheless, it is observable that the transmission increases at longer wavelengths. This is due to the fact that the mode confinement is weaker for longer wavelengths and therefore the mode-overlap is bigger. This results in a higher transmission.

Figure 8:
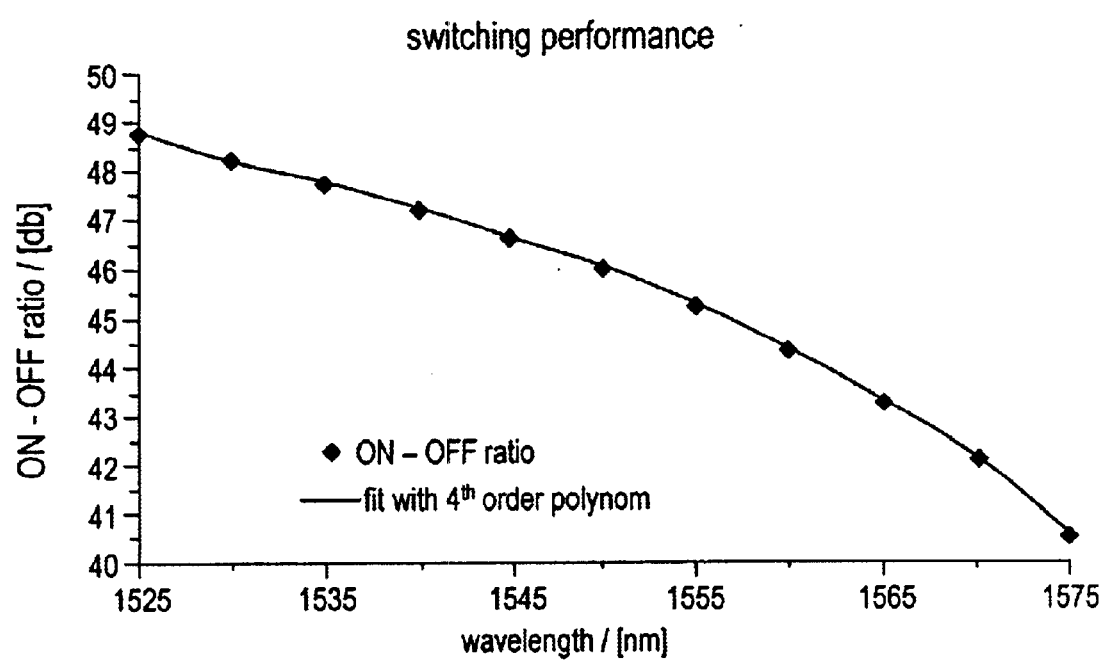
FIG. 8 is a graph showing the ON-OFF ratio of the switch.

The ON-OFF ratio is shown in FIG. 8. As a rule of thumb an ON-OFF ratio of 30 dB is required for a switch. The inventive device offers more than 40 dB over the entire bandwidth. It decreases with wavelength due to the increasing OFF-state transmission, but it is still more than 43 dB at 1565 nm.

The invention provides a basic mechanism for switching/modulating light guided in silicon waveguides by the use of the plasma dispersion effect. This has the potential to be used in many different applications. For example, switching in a coupler geometry (40 dB of ON-OFF Modulation is easily possible), Mach-Zehnder switch, Bragg grating tuning, Bragg resonator detuning, and ring filter tuning.

Although the present invention has been shown and described with respect to several preferred embodiments thereof, various changes, omissions and additions to the form and detail thereof, may be made therein, without departing from the spirit and scope of the invention.

What is claimed is:

1. An optical switch/modulating device comprising:
    a pump waveguide that provides a pump light to said switch/modulating device; and
    a waveguide element positioned parallel to said pump waveguide that receives said pump light that causes said waveguide element to switch or modulate a signal light running through the pumped waveguide.

2. The optical switch/modulating device of claim 1 further comprising input and output waveguides.

3. The optical switch/modulating device of claim 2, said input and output waveguides comprise Si.

4. The optical switch/modulating device of claim 2, wherein said input and output waveguides are surrounded by SiO$_2$.

5. The optical switch/modulating device of claim 1, wherein said pump waveguide comprises SiN.

6. The optical switch/modulating device of claim 1, wherein said pump waveguide comprises Si.

7. The optical switch/modulating device of claim 1, wherein said pump waveguide comprises a height of 200 nm and width of 400 nm.

8. The optical switch/modulating device of claim 1, wherein said pump waveguide comprises a single-mode behavior for a pump wavelength.

9. The optical switch/modulating device of claim 1, wherein said pump waveguide and waveguide element are surrounded by $SiO_2$.

10. The optical switch/modulating device of claim 1, wherein said waveguide element is totally isolated.

11. The optical switch/modulating device of claim 1, wherein said waveguide element is surrounded by $SiO_2$.

12. The optical switch/modulating device of claim 1, wherein said waveguide element and said pump waveguide form an active region.

13. A method of forming an optical switch/modulating device comprising:

providing a pump waveguide that provides a pump light to said switch/modulating device; and positioning a waveguide element parallel to said pump waveguide that receives said pump light that causes said waveguide element to switch or modulate a signal light running through the pumped waveguide.

14. The method of claim 13, wherein said waveguide element and said pump waveguide form an active region.

15. The method of claim 14, wherein said input and output waveguides are surrounded by $SiO_2$.

16. The method of claim 13, wherein said pump waveguide comprises a single-mode behavior for a pump wavelength.

17. The method of claim 16, said input and output waveguides comprise Si.

18. The method of claim 13, wherein said waveguide element comprises Si.

19. The method of claim 13, wherein said pump waveguide comprises a height of 200 nm and width of 400 nm.

20. The method of claim 13, wherein said waveguide element is totally isolated.

21. The method of claim 13, wherein said pump waveguide and waveguide element are surrounded by $SiO_2$.

22. The method of claim 13 further comprising providing input and output waveguides.

23. The method device of claim 13, wherein said waveguide element is surrounded by $SiO_2$.

24. The method of claim 13, wherein said pump waveguide comprises SiN.

* * * * *